United States Patent [19]
Homan et al.
[11] 4,177,322
[45] Dec. 4, 1979

[54] METHOD OF IMPROVING HIGH VOLTAGE INSULATING DEVICES

[75] Inventors: Gary R. Homan; Chi-Long Lee, both of Midland, Mich.

[73] Assignee: Dow Corning Corporation, Midland, Mich.

[21] Appl. No.: 901,053

[22] Filed: Apr. 28, 1978

[51] Int. Cl.[2] .......................... B32B 9/04; H01B 3/18; H01B 3/46; B32B 27/08

[52] U.S. Cl. .................................... 428/447; 428/383; 428/391; 174/137 A; 174/209; 427/58; 427/387; 252/63.7

[58] Field of Search .............. 427/58; 174/110 S, 209, 174/137 A; 339/111, 116; 428/391, 383, 447; 252/63.7

[56] References Cited

U.S. PATENT DOCUMENTS

| | | | |
|---|---|---|---|
| 2,428,608 | 10/1947 | Bass | 174/35 |
| 2,588,393 | 3/1952 | Kauppi | 260/18 |
| 3,511,698 | 5/1970 | Talcott | 427/58 |
| 3,912,650 | 10/1975 | Khalid | 252/63.7 |
| 4,011,168 | 3/1977 | Uhlmann | 252/63.7 |

OTHER PUBLICATIONS

Niemi, Self Priming Silicone . . . Bodies IEEE, Conf. Paper 71C38 EI-25 (1971).

*Primary Examiner*—Michael F. Esposito
*Attorney, Agent, or Firm*—Roger H. Borrousch

[57] ABSTRACT

The ability of high voltage insulating devices, such as electrical transmission line suspension insulators, to resist the development of excessive leakage currents is improved by coating the surface with specific silicone fluids. The fluids have a composition of a general formula:

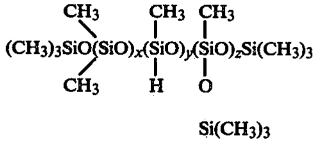

17 Claims, No Drawings

METHOD OF IMPROVING HIGH VOLTAGE INSULATING DEVICES

BACKGROUND OF THE INVENTION

1. Field of the Invention

This invention relates to a method of improving the insulating properties of high voltage electrical insulating devices and to the insulators manufactured thereby.

2. Description of the Prior Art

A persistant problem in the field of high voltage electrical insulating devices has been finding a suitable means for the prevention of leakage currents over the outer surface of the insulating devices. An early example of the problem and a solution is found in U.S. Pat. No. 2,428,608 to Bass in which an organopolysiloxane polymer was thickened and used as a grease to fill the space between an electrical conductor and a ground to prevent the formation of corona. U.S. Pat. No. 2,588,393 to Kauppi claimed a method of forming a film upon an article of manufacture comprising curing a mixture of methylhydrogensiloxane fluid and dimethylpolysiloxane high polymer on the surface to yield a tackfree surface. U.S. Pat. No. 3,511,698 to Talcott claims a process of applying to the surface of a rigid, cured thermosetting base member a dispersion of silicone elastomer stock and curing the same. In the examples, Talcott illustrated the improvement in arc resistance of an epoxy resin-glass fiber bar when it was coated with a 0.6 mm thickness of the silicone elastomer base. U.S. Pat. No. 4,011,168 to Uhlmann claims compositions of siloxane fluids, mineral filler, and a siloxane resin to produce grease-like compositions which are useful as electrical coatings to protect transmission insulators, distribution line insulators, and power substration bushings from flashovers.

The development of coatings for high voltage insulating devices such as suspension insulators and stand-off insulators used in electrical transmission and distribution systems has been necessary because the insulator, commonly constructed of glass or porcelain, becomes coated with contaminants which become conductive on exposure to moisture. Subsequent arcing over the surface may damage the insulator. The coatings disclosed in the prior art help to prevent this arcing by producing a hydrophobic surface to prevent the formation of continuous electrically conductive films on the insulator surface. The article "Self-Priming Silicone Elastomeric Coatings for High Voltage Insulator Bodies," Niemi, IEEE Conference Paper, 71C38 EI-25, 1971, disclosed a silicone elastomer that is useful for coating both ceramic type insulators and the new constructions of strong, lightweight synthetic or plastic insulators.

SUMMARY OF THE INVENTION

A method of improving the resistance of high voltage insulators to leakage currents when exposed to moisture or high humidity and contaminants comprises coating the insulator surface with specific polyorganosiloxane fluids defined by the formula $$(CH_3)_3Si(\underset{CH_3}{\overset{CH_3}{Si}}O)_x(\underset{H}{\overset{CH_3}{Si}}O)_y(\underset{\underset{Si(CH_3)_3}{O}}{\overset{CH_3}{Si}}O)_zSi(CH_3)_3$$

The presence of the above fluids on insulator surfaces raises their resistance to leakage currents at high voltages.

It is an object of this invention to improve the performance of high voltage insulators when they are subjected to moisture and contaminants while under electrical stress.

DESCRIPTION OF THE INVENTION

This invention relates to a method of improving an electrical insulating function of an outer surface of a solid electrical insulator wherein the improvement consists essentially of coating the surface with a composition of a general formula:

$$(CH_3)_3SiO(\underset{CH_3}{\overset{CH_3}{Si}}O)_x(\underset{H}{\overset{CH_3}{Si}}O)_y(\underset{\underset{Si(CH_3)_3}{O}}{\overset{CH_3}{Si}}O)_zSi(CH_3)_3$$

wherein x has an average value of at least 2; y and z each have an average value of 0 to 98; x plus y plus z is equal to a value of from 8 to 200 inclusive; y and z cannot be 0 simultaneously; when x, y and z each have an average value greater than 0, a ratio of x to y to z is about 7 to 4 to 1; when y is 0 then the ratio of x is z is from 0.3/1 to 7/1 inclusive and x plus z has a value less than 100; and when z is 0 then the ratio of x to y is from 0.3/1 to 7/1 inclusive and x plus y has a value less than 100.

Compositions useful in the method of this invention are known in the art. The compositions as shown above are trimethylsiloxy endblocked polyorganosiloxane fluids made up of units selected from trimethylsiloxy, dimethylsiloxane, methylhydrogensiloxane, and methyl(trimethylsiloxy)siloxane units.

When all three types of siloxane units are present, the polyorganosiloxane fluid has an average of between 8 and 200 units per molecule and an average ratio of dimethylsiloxane to methylhydrogensiloxane to methyl(-trimethylsiloxy)siloxane of about 7 to 4 to 1. A preferred form of such a composition has an average of 50 to 200 units per molecule. A most preferred composition has an average of about 160 units per molecule.

When the composition is made up of dimethylsiloxane and methylhydrogensiloxane units the polyorganosiloxane fluid has an average of between 8 and 100 units per molecule. A preferred form of polyorganosiloxane fluid has an average of between 8 to 25 units per molecule, with the most preferred molecular lengths being at the lower end of the range. A preferred form of the polyorganosiloxane fluid has x and y in the ratio of from 0.6/1 to 4/1 with the most effective composition having an average ratio of dimethylsiloxane to methylhydrogensiloxane of about 1.5/1. The molecular weight of the composition must be low enough to allow the composition to flow over the insulator surface to completely cover it.

When the composition is made up of dimethylsiloxane and methyl(trimethylsiloxy)siloxane units, the polyorganosiloxane fluid has an average of between 8 and 100 units per molecule. A preferred form of polyorganosiloxane fluid has an average of between 8 to 25 units per molecule, with the most preferred molecular lengths being at the lower end of the range. A preferred form of the polyorganosiloxane fluid has x and z in the ratio of from 0.6/1 to 4/1 with the most effective composition having an average ratio of dimethylsiloxane to methyl(trimethylsiloxy)siloxane of about 1.5/1. The molecular weight of the composition must be low enough to allow the composition to flow over the insulator surface to completely cover it.

Compositions useful in the method of this invention can be prepared by acid catalysed polymerization and equilibration techniques well known in the art. The compositions can be prepared by mixing the appropriate combination of polydimethylcyclosiloxane, polymethylhydrogencyclosiloxane, polymethyl(trimethylsiloxy)cyclosiloxane, and hexamethyldisiloxane with an acid, stirring the ingredients together for a period long enough to allow polymerization and equilibration to occur, and the acid catalyst can then be neutralized with sodium bicarbonate. The resulting mixture is then filtered to remove the salt and recover the polymer product for use in this invention.

Polydimethylcyclosiloxane, polymethylhydrogencyclosiloxane, and hexamethyldisiloxane are compounds well known in the art. Polymethyl(trimethylsiloxy)cyclosiloxane can be prepared by following a two-step reaction starting with the hydration of tetramethyltetrahydrogencyclotetrasiloxane to yield tetramethyltetrahydroxycyclotetrasiloxane, then silylating with hexamethyldisiloxane to yield tetramethyltetrakis(trimethylsiloxy)cyclotetrasiloxane. A description of the preparation is found in Example 9.

Compositions useful in this invention do not have to be a particular molecular species, for example, the compositions can be the polyorganosiloxane mixture produced above. Such a polyorganosiloxane mixture would contain random copolymers of mostly linear species but would also contain the equilibrium amount of cyclical species. The compositions described herein are understood to include specific species, as well as mixtures of the various molecular species obtained from a process of manufacture.

The outer surface of a solid electrical insulator is coated with a thin continuous film of the described polyorganosiloxane fluid. The surface can be coated with the polyorganosiloxane fluid by dipping, brushing, spraying or any other such method. The amount of fluid used is not critical as long as the surface is completely covered with a continuous coating. For the best results, sufficient polyorganosiloxane fluid should be applied so that the fluid just begins to drip from the insulator surface. Any additional fluid would be wasted as it would merely drain off. The exact amount of fluid remaining on the insulator surface will depend upon the viscosity of the fluid used.

The electrical insulators to be coated can be any of those described or known in the prior art, including those which are coated with a cured film of silicone rubber. The electrical insulators prepared by the method of this invention have an improved resistance to failure as observed by their ability to withstand higher electrical pressures before allowing leakage currents to reach a significant level.

Excessive leakage current over the surface of an insulator can cause catastrophic failure of the insulator. When used outdoors, an insulator surface can become contaminated by dust and dirt in the atmosphere. Many contaminants, such as salt from the sea, can form electrically conductive films on the insulator surface when the insulator surface is wetted by rain, fog, or dew. If conductive films are formed, a leakage current flows over the insulator surface from the energized conductor to the grounded end of the insulator. The current causes localized heating with consequent moisture evaporation and ultimately "dry band" formation. The "dry band" is an area where the film is no longer conductive due to loss of moisture. The electrical stress across the "dry band" often exceeds the breakdown stress of the air-insulation interface so that an electrical arc is formed. The arc temperature is extremely high, often 2000° C. or higher, so that the heat produced can have a significant effect upon the insulator surface.

If the insulator surface is porcelain, the localized heating can cause cracking due to the uneven thermal expansion of the brittle material. Such cracking can lead to complete mechanical failure of the insulator.

If the insulator surface is an organic resin or elastomer, the localized heating can cause erosion of the surface, eventually leading to failure of the insulator. The localized heating can also cause carbonization of the surface, thus destroying the insulating properties and leading to excessively high leakage currents.

It is a purpose of the method of this invention to prevent or suppress the initial formation of conductive films on the insulator surface, thereby preventing or suppressing the consequences discussed above.

To further describe the method of this invention the following examples are included for illustrative purposes only and should not be construed as limiting the invention which is properly delineated by the appended claims.

EXAMPLE 1

This example is typical of the state of the art as represented by a silicone elastomer coated insulator, known to show resistance to high voltage leakage currents.

Test Insulator Sample Preparation—A glass tube, 20-25 mm in diameter and 20 cm long was coated by brushing to give an approximately 0.1 mm thick coating of a composition comprising a polydimethylsiloxane, vinyl containing methylsiloxane resin, silica filler, methylhydrogensiloxane, and a platinum containing catalyst. After the coating was allowed to flow to a smooth uniform coating with the tube in an upright position, it was cured for 4 hours at 150° C. in an oven to provide an insulator with a cured silicone rubber surface to be referred to hereinafter as a test insulator.

Test Procedure—Samples were tested using the apparatus and procedure described by R. G. Niemi and T. Orbeck in the article "Test Methods Useful in Selecting Materials for Outdoor High Voltage Insulation," Proceedings 11th EI Conference, September 1973, paper No. 73CHO777-3EI-35. Fog for this test was generated from tap water containing 2.5 g NaCl per liter. A standard testing procedure was followed: The specimen was placed in the fog chamber and the electrodes were connected to the specimen at 15.2 cm apart. The chamber was then sealed and the fog started. After the fog reached steady-state conditions (in approximately 10 minutes), voltage was applied at a level 3 kilovolts (kV) below expected failure level. The leakage current levels were recorded periodically and the voltage level was increased by an increment of 3 kV after each hour. The failure point was the voltage level at the time the leakage current reached 100 milliamps. When the leakage current reached 100 milliamp level, the relay on the voltage testing transformer tripped. In all cases the specimen was tested for at least 1 hour at a voltage below that level which caused failure.

The test insulator with the cured silicone rubber surface as described above failed at a voltage level of 15 kV when tested by the Niemi et al. procedure. This insulator was considered a control for demonstrating this invention.

EXAMPLE 2

A trimethylsiloxy endblocked polymethylhydrogensiloxane fluid with a viscosity of approximately 0.03 Pa.s was coated on a test insulator prepared as described in Example 1. The fluid was brushed over the cured polydiorganosiloxane surface of the tube in an amount sufficient to allow a smooth continuous coating to flow over the surface. The fluid coated test insulator was then tested as described in Example 1. The sample failed at 21 kV. A duplicate sample failed at 18 kV. This fluid composition is outside the scope of the invention and is presented for comparative purposes.

EXAMPLE 3

A trimethylsiloxy endblocked polydimethylsiloxane fluid with a viscosity of 0.05 Pa.s was substituted for the fluid of Example 2. When tested by the procedures of Example 1, the sample failed at 24 kV. This fluid composition is outside the scope of the invention and is presented for comparative purposes.

EXAMPLE 4

A fluid with a composition of the average formula:

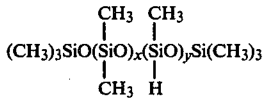

where the ratio of x to y was approximately 0.67 and x plus y had an average value of approximately 9, was coated as described in Example 2 on six test insulators and tested by the procedure described in Example 1. The samples failed at an average of 29.5 kV.

EXAMPLE 5

A series of compositions of the formula:

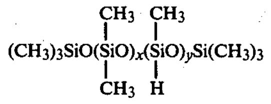

was prepared by the following general procedure. To a 250 ml, round bottom, three-necked flask equipped with condenser, thermometer, and stirrer, the amounts indicated in Table I of polydimethylcyclosiloxane, polymethylhydrogencyclosiloxane, and hexamethyldisiloxane were added. An acid was added as a polymerization catalyst. The solutions were stirred for 24 hours at room temperature to allow for polymerization and equilibration, when the composition was verified through the use of gas-liquid chromatography techniques. The catalyst was neutralized with ≅0.5 g of $NaHCO_3$ and stirred for 0.5 hour. The solution was then mixed with a filter aid and filtered through a sintered glass funnel with the aid of vacuum.

Each composition of Example 5 was applied as described in Example 2 to test insulators and tested by the procedure as described in Example 1. Failures were as shown in Table I.

Table I

| Run | x | y | $\frac{x}{y}$ | $(Me_2SiO)_4$ | $(MeHSiO)_4$ | $(Me_3Si)_2O$ | Failure, kV |
|---|---|---|---|---|---|---|---|
| A | 8.0 | 0 | — | 118.4gm | 0 gm | 32.4g | 21 |
| B | 6.4 | 1.6 | 4.0 | 94.7 | 19.2 | 32.4 | 33 |
| C | 4.8 | 3.2 | 1.5 | 71.0 | 38.4 | 32.4 | 39 |
| D | 3.2 | 4.8 | 0.67 | 47.4 | 57.6 | 32.4 | 30 |
| E | 1.6 | 6.4 | 0.25 | 23.7 | 76.8 | 32.4 | 22.5 |
| F | 0 | 8.0 | 0 | 0 | 96.0 | 32.4 | 24 |

Runs A, E, and F are outside the scope of this invention and are presented for comparative purposes.

EXAMPLE 6

A higher viscosity facsimile of the composition of Example 5, Run C, was prepared using the procedure described in Example 5 using 390 g of polydimethylcyclosiloxane, 710.4 g of polymethylhydrogencyclosiloxane, and 16.2 g of hexamethyldisiloxane. After polymerization, equilibration, and neutralization, the polymer was stripped of residual cyclics before filtration. The filtered polymer had a viscosity of approximately 0.4 Pa.s. The polymer averaged 160 units in length. The molecular weight of this fluid is outside the scope of the invention and is presented for comparative purposes.

The polymer was then coated as in Example 2 on test insulators and tested as in Example 1, failing at a level of 21 kV.

EXAMPLE 7

The polymer of Example 6 above was then mixed in the amount of 100 parts by weight with 1.7 parts of tetramethyldivinyldisiloxane and 2 parts of an organic peroxide. Samples were prepared as in Example 2 then heated for 16 hours at 150° C. in an oven to cure the catalyzed polymer. Testing as in Example 1 gave failure at 21 kV in only 0.18 hour, this being the starting voltage chosen. A repeat test started at 15 kV gave failure at 0.3 hours. This Example is presented for comparative purposes.

EXAMPLE 8

A series of compositions of the formula:

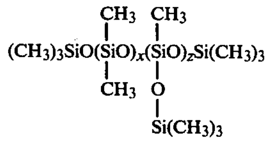

were prepared by the following procedure.

To a 1 liter three-necked flask, there was added 2 g of neutralized palladium on carbon catalyst, 45 g of a buffer solution of sodium hypophosphate and sodium hydroxide and 300 ml of dioxane. The flask was partially submerged in a constant temperature oil bath at 23° C. to control the exotherm temperature during reaction. Then, in each case, 30 g of the appropriate composition of Example 5, Run B through F, was added with rapid stirring for three hours. The catalyst was then filtered off to terminate the reaction. The products were analyzed through the use of nuclear magnetic resonance techniques. At this point the product was a solvent solution of the formula:

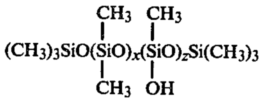

IN the second step, a 2 liter three-necked flask was equipped with a stirrer and heating mantle. A mixture of 300 ml of isopropyl alcohol, 150 ml of 37.2% hydrochloric acid, 300 g of crushed ice, and 200 ml of hexamethyldisiloxane was added to the flask. Then, in each run, the product of step one above was added with stirring. After stirring for one hour, the mixture was heated to a temperature of 50° C. for an additional hour. The mixture was transferred to a separatory funnel and the upper layer was washed three times with distilled water. The upper layer was then distilled to remove the excess hexamethyldisiloxane and solvent. The residue was filtered to yield the final composition.

Each of the final compositions was applied as described in Example 2 to a test insulator and tested by the procedure described in Example 1. Failures were as shown in Table II.

Table II

| Run | x | z | $\frac{x}{z}$ | Failure, kV |
|---|---|---|---|---|
| B | 6.4 | 1.6 | 4.0 | 31.5 |
| C | 4.8 | 3.2 | 1.5 | 27 |
| D | 3.2 | 4.8 | 0.67 | 27 |
| E | 1.6 | 6.4 | 0.25 | 22.5 |
| F | 0 | 8.0 | 0 | 24 |

Runs E and F are outside the scope of the invention and are presented for comparative purposes.

EXAMPLE 9

A. A composition of the formula:

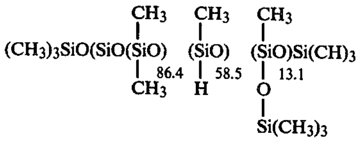

was prepared by the following procedure. A 250 ml three-necked flask was equipped with a reflux condenser, thermometer, stirrer and heating mantle. A mixture of 63.9 g of polydimethylcyclosiloxane, 35.1 g of polymethylhydrogencyclosiloxane, 19.4 g of

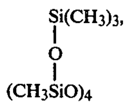

and 1.6 g of hexamethyldisiloxane was placed in the flask. The mixture was stirred and acid catalyst was added. The mixture was heated to 65° C. with stirring for 3 hours. Then the heating eas discontinued and the mixture neutralized with 5 g of $NaHCO_3$ with stirring for 0.5 hour. The mixture was filtered and the unreacted cyclic materials were stripped by heating to 170° C. under a vacuum (1330 Pa) to give the final polymeric composition. Gel permeation chromatographic analysis showed that the polymer consisted of 160 siloxane units.

The

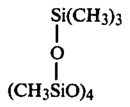

used in the above preparation was produced as follows:

Step One—To a five liter, three-necked flask, there was added 16 g of neutralized palladium on carbon catalyst, 360 g of buffer solution (prepared by mixing 0.65 g $NaH_2PO_4.H_2O$, 39.8 ml of 0.1 N NaOH, and 960 ml of water) and 2320 g of dioxane.

This mixture was stirred and 240 g of tetramethyltetrahydrogencyclotetrasiloxane was added over a two hour period. After 4 hours of additional stirring, the mixture was filtered to remove the catalyst.

Step Two—To a 12 liter, three-necked flask, there was added 1200 ml of isopropyl alcohol, 450 ml of 37% hydrochloric acid, 1200 g of crushed ice, and 800 ml of hexamethyldisiloxane. The stirrer was started and the mixture of step one above was added to the flask through an addition funnel over a 20 minute period. After the addition, the mixture temperature was raised to 50° C. for one hour. The mixture formed two layers, these layers were separated, and the top layer was washed three times with water, then the excess hexamethyldisiloxane (370 ml) was distilled from the washed top layer. The top layer was fractionally distilled yielding a product which had a boiling point of 142°-144° C. at a pressure of 800 Pa. This product had a structure of the formula

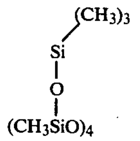

as confirmed by mass spectroscopy—GLC.

B. Ten grams of the composition prepared in A was mixed with 16 drops of tetramethyldivinyldisiloxane and a platinum containing catalyst. After brushing the polymer onto the surface of a test insulator, the polymer was allowed to cure at room temperature. The use of cured polymer is outside the scope of this invention and is presented for comparative purposes.

C. Five grams of the composition prepared in A was mixed with 24.6 drops of dimethylvinylsiloxy endblocked polydimethylsiloxane with a molecular weight of 571 and 15 drops of 2,5-dimethyl-2,5-di-(tertiarybutylperoxy)hexane catalyst. After brushing the catalyzed mixture onto the surface of a test insulator, the mixture was cured for 15 minutes at 200° C.

D. The composition prepared in A was brushed onto a test insulator by the method described in Example 2.

E. The composition prepared in A was brushed onto a test insulator, then cured by exposure to gamma radiation for a cobalt 60 source. The use of cured polymer is outside the scope of the invention and is presented for comparative purposes.

Each of the above coated test insulator was then tested as described in Example 1. The results were as shown in Table III. These coated insulators show that the composition must be a low viscosity fluid to give the highest values at failure.

Table III

| Insulator | Cured | Failure kV |
|---|---|---|
| B | yes | 19 |
| C | yes | 21 |
| D | no | 30 |
| E | yes | 21 |

What is claimed is:

1. A method of improving an electrical insulating function of an outer surface of a solid electrical insulator wherein the improvement comprises coating the surface with a composition consisting essentially of of a general formula:

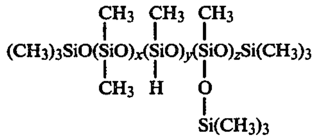

wherein x has an average value of at least 2; y and z each have an average value of 0 to 98; x plus y plus z is equal to a value of from 8 to 200 inclusive; y and z cannot be 0 simultaneously; when x, y, and z each have an average value greater than 0, a ratio of x to y to z is about 7 to 4 to 1; when y is 0 then the ratio of x to z is from 0.3/1 to 7/1 inclusive and x plus z has a value less than 100; and when z is 0 then the ratio of x to y is from 0.3/1 to 7/1 inclusive and x plus y has a value less than 100.

2. The method of claim 1 where x, y, and z are in the ratio of about 7 to 4 to 1 and the average value of x plus y plus z is from 50 to 200.

3. The method of claim 1 where z is zero.

4. The method of claim 3 where x and y are in the ratio of from 0.6/1 to 4/1, and x plus y is from 8 to 25.

5. The method of claim 3 where x and y are in the ratio of about 1.5/1 and x plus y is about 8.

6. The method of claim 1 where y is zero.

7. The method of claim 6 where x and z are in the ratio of from 0.6/1 to 4/1 and x plus z is from 8 to 25.

8. The method of claim 7 where x and z are in the ratio of about 1.5/1 and x plus z is about 8.

9. The method of claim 1 wherein the outer surface of the solid electrical insulator is a cured elastomer.

10. The method of claim 9 wherein the cured elastomer is a polydiorganosiloxane.

11. The method of claim 9 wherein z is zero, x and y are in the ratio of from 0.6/1 to 4/1 and x plus y is from 8 to 25.

12. The method of claim 9 wherein y is zero, x and z are in the ratio of from 0.6/1 to 4/1 and x plus z is from 8 to 25.

13. The method of claim 10 wherein z is zero, x and y are in the ratio of from 0.6/1 to 4/1 and x plus y is from 8 to 25.

14. The method of claim 10 wherein y is zero, x and z are in the ratio of from 0.6/1 to 4/1 and x plux z is from 8 to 25.

15. A solid electrical insulator prepared by the method of claim 1.

16. A solid electrical insulator prepared by the method of claim 9.

17. A solid electrical insulator prepared by the method of claim 10.

* * * * *

UNITED STATES PATENT AND TRADEMARK OFFICE

CERTIFICATE OF CORRECTION

PATENT NO. : 4,177,322

DATED : December 4, 1979

INVENTOR(S) : Gary R. Homan and Chi-long Lee

It is certified that error appears in the above—identified patent and that said Letters Patent is hereby corrected as shown below:

Column 1, line 36 - the word "substra-" should read "substa-"

Column 2, line 28 - the phrase "x is z" should read "x to z"

Column 5, line 59 - the word "when" should read "then"

Column 7, line 7 - the word "IN" should read "In"

Column 7, lines 40-45 - the formula $$(CH_3)_3SiO(SiO(\overset{CH_3}{\underset{CH_3}{SiO}})_{86.4}(\overset{CH_3}{\underset{H}{SiO}})_{58.5}(\overset{CH_3}{\underset{\underset{Si(CH_3)_3}{O}}{SiO}})_{13.1}Si(CH)_3$$

should read $$(CH_3)_3SiO(\overset{CH_3}{\underset{CH_3}{SiO}})_{86.4}(\overset{CH_3}{\underset{H}{SiO}})_{58.5}(\overset{CH_3}{\underset{\underset{Si(CH_3)_3}{O}}{SiO}})_{13.1}Si(CH)_3$$

UNITED STATES PATENT AND TRADEMARK OFFICE

CERTIFICATE OF CORRECTION

PATENT NO. : 4,177,322

DATED : December 4, 1979

INVENTOR(S) : Gary R. Homan and Chi-long Lee

It is certified that error appears in the above—identified patent and that said Letters Patent is hereby corrected as shown below:

Column 7, line 61 - the word "eas" should read "was"

Column 8, line 61 - the phrase "for a cobalt" should read "from a cobalt"

Signed and Sealed this

*Tenth* Day of *August 1982*

[SEAL]

*Attest:*

GERALD J. MOSSINGHOFF

*Attesting Officer* *Commissioner of Patents and Trademarks*